May 29, 1928.  1,671,487
F. A. QUIROZ ET AL
STRAINER FOR FLUIDS
Filed April 1, 1926
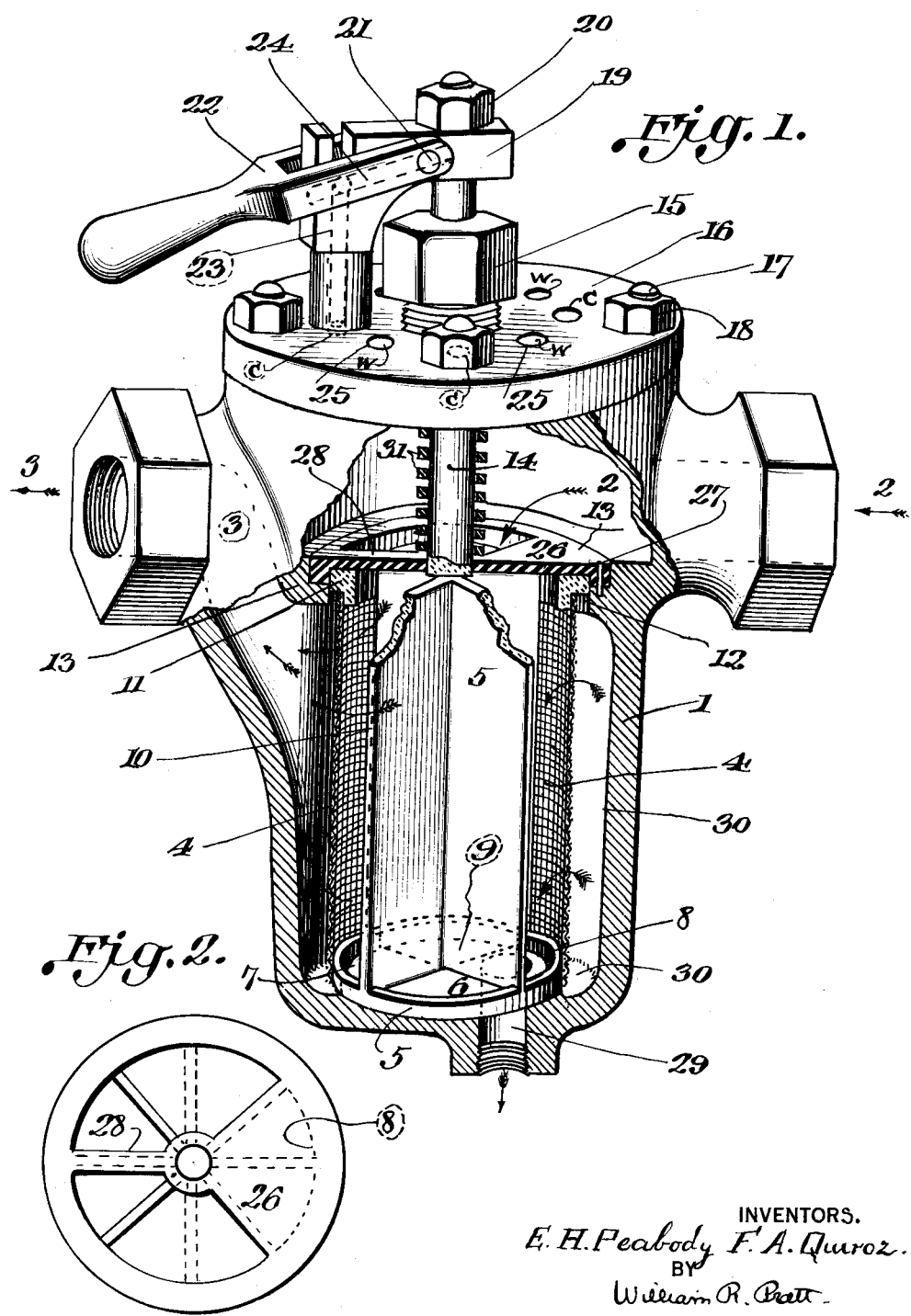
INVENTORS.
E. H. Peabody  F. A. Quiroz.
BY
William R. Pratt
ATTORNEY Patented May 29, 1928.

1,671,487

UNITED STATES PATENT OFFICE.

FRANCISCO ANGEL QUIROZ AND ERNEST HENRY PEABODY, OF NEW YORK, N. Y., ASSIGNORS TO PEABODY ENGINEERING CORPORATION, A CORPORATION OF NEW YORK.

STRAINER FOR FLUIDS.

Application filed April 1, 1926. Serial No. 99,001.

Our invention relates to strainers or filters, the object of which is to remove extraneous matter from fluids either liquid or gaseous, and which may be cleaned without interrupting the flow of the fluid.

A further object of our invention is to produce a strainer which can be cleaned by a reverse flow of the fluid and which therefore does not require opening and removal of the basket or filtering material.

These and other objects of the invention will be apparent from the following description of which the accompanying drawings form a part.

Referring to the drawings:

Figure 1 is a perspective view of the strainer partly in section.

Figure 2 is the top view of the basket of the strainer and the plate superimposed thereon.

Referring to Figure 1, the body portion of the strainer 1 is provided with an inlet for the fluid 2 and outlet 3. The filtering agent consists of a wire mesh basket 4 which is cylindrical in shape and contains perforations of the necessary size for the special purpose required.

This wire basket is carried on a frame 5 which is open at the top and bottom and which is divided into four compartments, 6, 7, 8 and 9, by four dividing walls, the edges of which, as for example the edge shown at 10, serve to support the wire mesh cylindrical screen. The top of this frame consists of a rim 11 which fits into a cylindrical portion 12, bored in a partition wall or diaphragm 13 in the strainer, this being so located that the fluid will enter above it through the inlet passage 2, pass through the opening 12 and find its way out through passage 3. When the frame 5 is properly covered with a wire screen and inserted in the opening 12 the top of the rim or flange 11 of the frame 5 will just fit the opening 12 and it will therefore be necessary for all the fluid in passing through passage 2 to the outlet 3 to pass through the cylindrical screen, as shown by the arrows. Any extraneous matter in the fluid will be prevented from passing through the screen and remain on the inside of the cylinder.

Integral with the frame 5 or firmly fastened thereto there is a rod 14 which passes up through a stuffing box 15 in the top plate of the strainer 16. This plate is firmly fastened to the body portion of the strainer by bolts and nuts 17 and 18. The upper end of the rod 14 after passing through the stuffing box is firmly fastened to the arm 19 and kept in place by nut 20. If desired, the top end of the rod may be squared and inserted through a square hole in the arm 19 or otherwise attached thereto.

Attached to the arm 19 by pins 21 there is a lever 22 with a suitable handle which can be moved up and down on the pins 21 and carrying with it a T-headed pin shown in dotted line 23, the top of which may slide in the slots 24 in the arms of the lever 22. Thus, this pin 23 can be lifted up with the handle and the whole thing including the handle 22, the arm 19, the rod 14 and the strainer frame 5 carrying the wire mesh 4 may be rotated entirely around the circle.

In the top plate of the strainer 16 there are arranged a number of holes 25 drilled partly into the plate and so situated as to be in the path of the pin 23 when the handle 22 is rotated over one of these holes, when the pin can drop down into this hole a short distance and thus serve to fasten the strainer in a fixed position. Thus when the handle 22 is down the strainer is in a fixed position. When the handle 22 is lifted the pin 23 is withdrawn from the hole 25 and may be moved to another location as indicated by another hole. There are eight of these holes evenly located around the circle, representing eight different fixed positions in which the strainer and frame work can be placed. The purpose of these eight positions will hereinafter be explained.

Superimposed above the flange 11 of the frame 5 after the strainer is in position and so designed as to fit closely thereon, there is a plate 26 which fits into a suitable counter-sunk depression in the partition 13 or diaphragm so that it serves to complete this partition wall across the top of the strainer basket. This plate 13 is firmly fastened to the body portion of the strainer by the pin 27 and may also be held down by the spring 31. The plate 26 is not continuous but is cut away to form two openings as shown in Figure 2. These openings are separated by the rib 28 merely for structural purposes. The combined area of the two openings, however, is substantially equal to three quarters of the area represented by the top of the strainer basket. The closed or solid portion of plate 26 covers approximately one quarter of the area of the basket.

In Figure 1 the strainer basket is set so that one of the four divisions comes completely under the closed portion of the plate 26 and it will be obvious that in this position the fluid is cut off from compartment 8 and can enter only three of the compartments of the strainer as indicated by the numbers 6, 7 and 9. If, however, the strainer be rotated forty-five degrees bringing the walls of the compartments in the positions shown by the dot and dash lines in Figure 2, then all the four compartments will receive the fluid. Thus, if the basket be rotated forty-five degrees in clockwise direction from the position shown in Figure 1, one half of compartment 9 and one half of compartment 8 will be covered by the closed portion of the plate 26 leaving half of each of these compartments open to the flow of the fluid. This amount of opening is sufficient to keep each of these compartments fully supplied. Compartments 6 and 7 are completely open, the division wall between these two divisions coming directly under the structural rib 28.

This constitutes the working or operating position of the strainer, that is, all compartments being open to the flow of the fluid, and it will be obvious that there are four different points which will give this operating position, that is, two compartments half open at the top and two compartments completely open at the top. Likewise there will be four intermediate positions in which the basket will be so set that only three divisions receive the fluid, there being four different settings to secure this condition of the strainer.

This position of the strainer is called the "cleaning" position, the intermediate positions being known as the "working" positions. These are indicated by the four holes in the top plate marked "C" and the four intermediate holes marked "W". It will be observed, however, that in all eight positions of the strainer the fluid will still be permitted to pass through the basket the only difference being that in the cleaning position one of the compartments is closed off, the fluid passing through the other three compartments, whereas in the working position all compartments are in use for straining.

At the bottom of the strainer body and directly under the closed portion of the plate 26 there is an outlet passage 29 which opens directly into the compartment which is closed off by the closed portion of the plate 26 when the strainer is set in any one of the four cleaning positions. Into this connection 29 a pipe is connected supplied with a valve, neither the valve nor the pipe being shown in the drawing. In the normal operation of the strainer this valve is kept closed effectually blocking the outlet 29 so that no fluid can pass therefrom. If, however, this valve is open fluid can be passed through the passage to a suitable tank.

The operation of the strainer is as follows:

The inlet 2 and outlet 3 of the strainer will be opened so that the fluid may pass through the strainer. The cleaning outlet 29 will be closed. The lever 22 may be placed in any position with the pin in any one of the eight holes 25. As the fluid passes through the strainer extraneous matter collects on the inside of the screen or filtering material permitting only the clear fluid to pass through to the outlet 3. In the course of time as the cleaning surface becomes fouled with the extraneous matter and it is desirable to clean the strainer, the lever 22 and the pin 23 will be lifted and swung into one of the "cleaning" positions. The pin on dropping into the proper hole in plate 16 will lock the strainer in this position. As already explained this will block off one of the four compartments in the strainer basket. The outlet 29 will then be opened allowing the fluid to flow through at a considerable velocity for a short period. This will cause a reversal of flow in that portion of the basket which is comprised in the particular compartment, as explained, has been closed off from the direct flow of the fluid. In other words, instead of the fluid passing from the inside of the basket to the outside, it will enter the particular compartment which is being cleaned, from the outside of the basket to the inside and pass through the outlet 29. This reversal of the flow of the fluid will remove the material which has clogged the strainer and carry it away to the settling tank. It will be noted that the body of the strainer is sufficiently enlarged so that a chamber is formed outside the basket as indicated at 30, thus permitting the reversed flow above explained.

After allowing the fluid to flow through the basket in a reverse direction, the outlet 29 is closed and the lever 22 lifted and the pin moved to the next cleaning position. That is the basket will be rotated ninety degrees and another compartment brought in under the closed portion of the plate 26. The passage 29 will again be opened a sufficient length of time to remove the extraneous material and again closed. The lever 22 will again be lifted and moved to the next compartment, and so on until all compartments have been cleaned. The lever 22 will then be set so that the pin 23 is dropped into any one of the holes in the "working" position and the strainer will continue in operation until such time as it again requires cleaning.

We have illustrated and described our invention in the form preferred by us but it may be modified in various ways without departing from the spirit of the invention.

We claim as our invention:

1. A strainer for fluids comprising a body portion, a space therein, a screen dividing the space into two parts, means for admitting fluid to one part and passing all of said fluid through said screen to the second part, and means for subdividing the first part of said space whereby a portion of the fluid may be passed back through a portion of the screen in a reverse direction to remove matter from the screen.

2. A strainer for fluids comprising a body portion, a space therein, a portion of said space consisting of a chamber surrounded by a screen, means for admitting a fluid to said chamber and passing same through said screen, means for dividing said chamber and said screen into a plurality of parts and means for causing a portion of said fluid to pass through one or more of said parts in a reverse direction to remove matter from said screen.

3. In a strainer for fluids an upper and lower part, separated by a plate or diaphragm having an opening therein and a closed portion, a screen in the lower part enclosing a chamber therein, division walls whereby the space comprising said chamber is subdivided into a plurality of compartments each having an opening at the top corresponding to the closed area of the diaphragm, means for bringing each of these compartments consecutively under said closed portion of the diaphragm and the remaining compartments under the opening in the diaphragm, means for passing a fluid through the opening in the diaphragm and through the screen in the compartments in communication therewith, and means for passing a portion of the screened fluid through the screen of the compartment under the closed portion of the diaphragm in a reverse direction to remove matter from the screen.

4. In a strainer for fluids a screen basket, means for passing a fluid through said basket, partitions therein to divide said basket into a plurality of compartments, means for bringing each of said compartments consecutively into a position wherein the supply of fluid will be cut off, and means for withdrawing fluid from said compartment whereby a reverse flow is established to remove matter from the screen.

5. A strainer of the class described, comprising a casing, a screen movable therein and including a plurality of independent compartments, the casing having an inlet delivering to all of the compartments and an outlet to which all of the compartments deliver, and means in connection with the screen and the casing enabling a reverse flow through any selected compartment to an independent discharge thereby to clean said compartment.

6. A strainer of the class described, including a casing, and a substantially cylindrical screen rotatable therein, said casing having an outlet at its top communicating with the space outside the screen and an inlet above the screen, a drain outlet at the bottom of the casing eccentrically positioned with respect to the screen, a closure between the outlet and the screen for the top of a compartment when said compartment is positioned above the drain outlet and means to rotate the screen.

7. A strainer comprising a casing, a substantially cylindrical screen mounted to rotate in the casing, radial partitions dividing the interior of the screen into similar compartments, the casing having an outlet near its top communicating with the space outside the screen, and an inlet above the screen, a plate supported in the casing between the inlet and the top of the screen and having a solid portion of a size and shape to close the top of one compartment, said casing having a closable outlet below said solid portion to communicate with a compartment when said compartment is beneath the solid portion, and means to rotate the screen.

8. A strainer comprising a casing, a substantially cylindrical screen mounted to rotate in the casing, radial partitions dividing the interior of the screen into similar compartments, the casing having an outlet near its top communicating with the space outside the screen, and an inlet above the screen, a plate supported in the casing between the inlet and the top of the screen and having a solid portion of a size and shape to close the top of one compartment, said casing having a closable outlet below said solid portion to communicate with a compartment when said compartment is beneath the solid portion, means to rotate the screen, and means to hold the screen with any compartment beneath the solid portion of the plate or with all of the compartments open.

FRANCISCO ANGEL QUIROZ.
ERNEST HENRY PEABODY.